3,594,179
METHOD OF PRODUCING KVASS WORT CONCENTRATE
Dmitry Amosovich Korolev, Ul. Chkalova 2/5, kv. 23; Ljudmila Sergeevna Salmanova, Ul. Korolenko 1, korpus 3; Valentina Ivanovna Bukanova, Donskaya ul. 28/32, kv. 146; Petr Ivanovich Bukovsky, Gorodok Mossoveta 6, proezd 3, kv. 2; Lidia Semenovna Sheptun, Proletarsky raion, pos. Lenino, ul. Severenaya 10; and Elena Natanovna Chipchina, 9-Ul. Oktyabrskogo polya 7, kv. 50, all of Moscow, U.S.S.R.
No Drawing. Filed Feb. 28, 1967, Ser. No. 619,200
Int. Cl. C12c 7/00
U.S. Cl. 99—52      2 Claims

ABSTRACT OF THE DISCLOSURE

A process for preparing concentrated kvass wort for cold beverages comprising mashing germinated malt, adding a cytolytic enzyme to a mixture of the mashed malt, flour and water, cytolyzing said mixture, proteolyzing said mixture and evaporating the mixture under vacuum whereby melanoidins are produced directly in the malt.

BACKGROUND OF THE INVENTION

This invention relates to the commercial production of fermented cold beverages and, more particularly, to a method of producing concentrated wort, preferably kvass wort.

Methods are known for the production of concentrated kvass wort or grain kvasses by obtaining the wort from mixtures of dry rye and barley malt, rye or barley flour and water.

According to the known methods of producing dry rye of barley malt, grain intended for malting is cleaned, sorted, steeped in water to obtain a specified moisture content and germinated for the formation and accumulation of the required enzyme complexes. The freshly germinated malt is dried to a specified moisture content with a view toward forming and accumulating the required melanoidins which impart flavor, aroma and color and which determine the character and quality of the beverage.

From a mixture of dry rye and barley malt, flour and water, or from malt bread baked from said mixture of dry malt and flour, kvass wort is first prepared. It is then evaporated to the specified concentration in vacuum or under atmospheric pressure and packaged for transport or in containers for distribution to the consumer.

Kvass extract or grain extract is prepared by mixing concentrated kvass wort with sugar syrup, citric or lactic acid and other kvass ingredients, and then evaporating under atmospheric pressure to the required concentration.

Concentrated wort, particularly kvass wort, prepared by the conventional methods, does not provide a high quality beverage and does not keep well in storage.

While drying the malt, the enzyme complexes are destroyed through thermal inactivation, which necessitates the production of concentrated wort or kvass only from a mixture of dry rye and barley malt and a small amount of flour. The potential for melanoidin formation during the process of drying the malt is very low due to the presence of insufficient amounts of the reducing sugars and aminoacids reacting in the process.

The production of concentrated wort by the conventional methods involves considerable losses of rye and barley extractive when processing them into dry malt and when processing the malt and flour into kvass wort.

The conventional methods of producing wort concentrate involve considerable expenditures and losses of raw material, time, labor and materials due to the low level of production, techniques and equipment.

It is an object of the present invention to overcome the above disadvantages.

It is another object of the present invention to provide an improved method of producing concentrated wort, preferably kvass wort, which ensures a high quality of the resultant beverage, while reducing the loss of the extractives contained in the starting material.

SUMMARY OF THE INVENTION

To achieve the above and other objects, the invention provides a new method of producing concentrated wort for cold beverages, according to which freshly germinated malt is mashed. To a mixture of malt, flour and water a cytolytic enzyme preparation of a culture of the fungus Trichothecium roseum is added and enzymatic hydrolysis of the substances of the intercellular walls in flour and malt (cytolysis) is carried out, followed by enzymatic hydrolysis of the mash proteins (proteolysis). The formation of melanoidins imparting the bread and malt flavor, aroma and color takes place directly in the wort during the step of evaporating the latter in vacuum.

Kvass wort is preferably prepared from freshly germinated rye malt (30–55% by weight), rye flour (44–70% by weight) and a cytolytic preparation (0.1–0.4% by weight) by mixing the entire mass with water in a ratio of 1:3 to 1:4.

Cytolysis of the mixture of malt, flour, enzyme preparation and water can be carried out at a temperature of 40–42° C. for 1–2 hrs., followed by proteolysis of the mixture at a temperature of 50–52° C. for 1–2 hrs., and further by conversion of the starch in the mixture into sugar and separation and clarification of the wort.

Beer wort is preferably prepared from freshly germinated barley malt (10–30% by weight), barley flour (69–90% by weight) and a cytolytic preparation (0.5–0.8% by weight) by mixing the entire mass with water in a ratio of 1:3 to 1:4.

Formation of melanoidins is preferably carried out at a concentration of wort extractives of 63–68% and a temperature of 80–105° C.

DETAILED DESCRIPTION OF THE INVENTION

The present method of producing concentrated kvass wort consists of the following steps:

Cleaned and sorted rye is steeped in water by the air-water or preferably air-spray method at a temperature of 10–12° C. for 20–24 hrs. until the moisture content reaches 42–44% and sprouts emerge.

The steeped rye is germinated for malt so as to achieve maximum formation and accumulation of the required enzyme complexes (cytolytic, proteolytic, aminolytic and others). Germination is carried out at a temperature of 12–15° C. for 4 days. During germination the grain is stirred, thus affording the access of atmospheric oxygen and removal of carbon dioxide. The grain is remoistened if necessary.

For better solution of the malt and accumulation of maximum amounts of proteolytic enzymes, the grain, before germination is completed, is held for 6–10 hrs. without access of air and without stirring, the temperature of the malt not exceeding 50° C. Freshly germinated rye malt is sometimes slightly sun dried and kibbled in water in a ratio of 1:3 to 1:4 utilizing hammer mills, thus converting it to malt milk which is used for making kvass wort.

Before mashing, rye flour, dry or precooked in water in pressure cookers and then cooled, is mixed with the malt milk and cytolytic enzyme preparation of a fungus culture or purified preparation of Trichothecium roseum. Precooking on the flour is necessary to promote rupturing of the starch grains of the flour, paste formation and partial enrichment of the mash with melanoidins.

The process of preparing (mashing) the first kvass wort with the object of achieving maximum enzymatic hydrolysis of the starch and proteins of the malt and flour, thus converting them into soluble sugars, dextrins and amino acids, which are brought into aqueous solution, consists of the following steps:

5% of rye flour, either cooked or uncooked, and 50% of freshly germinated rye malt in the form of malt milk (in terms of flour moisture content) are mixed with warm water (not warmer than 42° C.) in a ratio of 1:3 to 1:4, depending on the preset concentration of the kvass wort. When the temperature of the mash (mixture) reaches 40° C., the above mentioned enzyme preparation is added in a proportion of 0.2% by weight of the malt and flour. The mash is prepared in such a way as to obtain an initial concentration of wort extractives of the order of 14–15% Balling.

The kvass mash thus prepared must undergo the following steps:

(a) Cytolysis at a temperature of 40–42° C. for 1–2 hrs. periodically stirring the mash for 5 min. at 30-minute intervals; the object of this step is to achieve enzymatic hydrolysis (splitting) of the substances of the intercellular walls in the malt and flour (hemicelluloses, gummy substances, etc.).

(b) Deeply-penetrating proteolysis at a temperature of 50–52° C. for 1–1.5 hrs. periodically stirring for 5 min. at 30-minute intervals as is done during cytolysis; the object of proteolysis is the deeper and more complete splitting of the proteins to soluble amino acids and proteins having medium molecular weights.

(c) Sugar formation in the mash at a temperature of 62–63° C. for 30 min. and a temperature of 73–75° C. for 20–30 min.; the object is enzymatic hydrolysis of the starch of the malt and flour to fermentable sugars;

(d) Coagulation of sparingly soluble proteins of the mash by boiling the latter for 2 hrs.;

(e) Separation of the first kvass wort from the grounds and its clarification.

The first kvass wort thus prepared is fed to a vacuum apparatus to carry out the process of melanoidin formation, i.e., the formation of melanoidins imparting the bread flavor, aroma and color, which determine the characteristic features and quality of grain kvass as a beverage.

This process consists in bringing the concentration of the extractives contained in the first kvass wort to 63–65% Balling at a temperature of 53–64° C., raising it to 80–105° C. after reaching the specified concentration, and holding the wort at this temperature for 30–35 min. or longer, depending on the intended purpose for the concentrate, and completion of the reaction of melanoidin formation at the stage ensuring the characteristic bread flavor, aroma and color of the concentrate and kvass made therefrom.

The concentrated kvass wort thus prepared is blended with all the ingredients of grain kvass in order to obtain concentrated kvass.

When producing concentrated bottled grain kvasses, concentrated wort is mixed with sugar syrup to give a concentration of 63–68% Balling, the content of grain extractives being not lower than 27–28% Balling. To the concentrated wort is added citric or lactic acid to give an acidity in the finished grain kvass equivalent to 3–4 ml. of normal alkaline solution per 10 ml. of kvass as determined by titration. Aqueous or alcoholic infusions of aromatic herbs, roots and spices can be added to the concentrated wort, while to barreled concentrated kvass wort lactic acid bacteria and yeasts may be added.

After blending and thorough mixing the finished concentrated grain kvass is tested for compliance with specifications and reference standards and packaged for transport or for the consumer.

When producing concentrated beer wort, instead of freshly germinated rye malt and rye flour, there are utilized 10 to 30% of freshly germinated barley malt, 69 to 90% of barley flour, 0.4–0.8% (by weight of malt and flour) of cytolytic enzyme preparation in the form of a culture of the fungus Trichothecium roseum and water in a ratio of 1:3 to 1:4. After mashing, the following processes are carried out: cytolysis, proteolysis, conversion, coagulation of mach proteins, separation of the wort from the grounds, clarification and vacuum-evaporation of the wort in order to produce malt melanoidins imparting the characteristic flavor, aroma and color.

Grain kvasses prepared from concentrated kvass wort have excellent flavor and properties beneficial to health.

What is claimed is:

1. A method of producing concentrated kvass wort which comprises mixing 30–55% by weight of freshly germinated rye malt and 44–70% by weight of rye flour with water in the ratio of 1:3 to 1:4, adding a cytolytic enzyme preparation of the fungus *Trichothecium roseum* to the mixture obtained in an amount of 0.1–0.4% by weight of said malt and flour, carrying out enzymatic hydrolysis of the substances of the intercellular walls of flour and malt over a period of 1 to 2 hours at a temperature of 40–42° C. in the mixture obtained, followed by enzymatic hydrolysis of the proteins over a period of 1 to 2 hours at a temperature of 50–52° C. in said mixture, converting the starch of the mixture into sugar, coagulating the sparingly soluble proteins by boiling said mixture, separating the grounds, clarifying the wort and evaporating the wort in vacuum, the formation of melanoidins which impart the bread and malt flavor, aroma and color to the wort taking place in the wort while said wort is being evaporated in vacuum, the formation of melanoidins being carried out in wort containing 63–68% of extractives and at a temperature of 80–105° C.

2. A method of producing concentrated beer wort which comprises mixing 10–30% by weight of freshly germinated barley malt and 69–90% by weight of barley flour with water in the ratio of 1:3 to 1:4, adding a cytolytic enzyme preparation of the fungus *Trichothecium roseum* to the mixture obtained in an amount of 0.5–0.8% by weight of said malt and flour, carrying out enzymatic hydrolysis of the substances of the intercellular walls of flour and malt at a temperature of 40–42° C. followed by enzymatic hydrolysis of the proteins at a temperature of 50–52° C. converting the starch of the mixture into sugar, coagulating sparingly soluble proteins by boiling said mixture, separating the grounds, clarifying the wort and evaporating the wort in vacuum, the formation of melanoidins which impart the bread and malt flavor, aroma and color to the wort taking place in the wort while said wort is being evaporated in vacuum, the formation of melanoidins being carried out in wort containing 63–68% of extractives and at a temperature of 80–105° C.

References Cited

UNITED STATES PATENTS 2,790,718  4/1957  Nugey _____ 99—51

FOREIGN PATENTS 136,290  1961  U.S.S.R.

OTHER REFERENCES

C. A., Veselov, et al., vol. 56, 3919d, 1962; Salmanova et al., vol. 62, 6837d, 1965.

Luers, Institute of Brewing, J., vol. 56, pg. 65, 1950.

JOSEPH M. GOLIAN, Primary Examiner

U.S. Cl. X.R.

99—31